United States Patent
Derian-Toth et al.

(10) Patent No.: US 12,281,799 B2
(45) Date of Patent: Apr. 22, 2025

(54) STOVE FUEL HEAT REFLECTOR

(71) Applicants: Garrett Maxwell Derian-Toth, Plymouth, MI (US); Hughie Cade Kellner, Uvalde, TX (US)

(72) Inventors: Garrett Maxwell Derian-Toth, Plymouth, MI (US); Hughie Cade Kellner, Uvalde, TX (US)

( * ) Notice: Subject to any disclaimer, the term of this patent is extended or adjusted under 35 U.S.C. 154(b) by 0 days.

(21) Appl. No.: 18/133,525

(22) Filed: Apr. 12, 2023

(65) Prior Publication Data

US 2024/0344715 A1 Oct. 17, 2024

Related U.S. Application Data

(63) Continuation of application No. 17/092,141, filed on Nov. 6, 2020, now abandoned.

(51) Int. Cl.
*F24C 15/22* (2006.01)
*F24C 3/00* (2006.01)
*F24C 3/12* (2006.01)
*F24C 3/14* (2021.01)

(52) U.S. Cl.
CPC ............. *F24C 15/22* (2013.01); *F24C 3/002* (2013.01); *F24C 3/126* (2013.01); *F24C 3/14* (2013.01)

(58) Field of Classification Search
CPC ............. F24C 15/22; F24C 3/126; F24C 3/08
USPC ...................................... 126/38, 40
See application file for complete search history.

(56) References Cited

U.S. PATENT DOCUMENTS

| | | |
|---|---|---|
| 3,538,907 A | 11/1970 | Bowman |
| 3,713,432 A | 1/1973 | Finley |
| 3,812,839 A | 5/1974 | Helgeson |
| 3,890,952 A | 6/1975 | Hamre |
| D245,220 S | 8/1977 | Chan |
| 4,426,990 A | 1/1984 | Shepherd |
| 4,829,975 A | 5/1989 | Hair |
| 5,195,500 A | 3/1993 | Lerner |
| 5,682,872 A | 1/1997 | Whitted |
| 5,992,407 A | 11/1999 | Tsai |
| D450,976 S | 11/2001 | Mosher |
| D498,976 S | 11/2004 | Schutle |
| 8,104,494 B2 | 1/2012 | Elder |
| 8,360,049 B2 | 1/2013 | Stephens |
| 2005/0241630 A1 | 11/2005 | May |
| 2006/0086351 A1 | 4/2006 | Wilgus |
| 2008/0078377 A1 | 4/2008 | Gardner |
| 2009/0314274 A1 | 12/2009 | Huggins |
| 2017/0102151 A1 | 4/2017 | Mushnick |
| 2019/0277468 A1 | 9/2019 | Wegert |
| 2020/0363068 A1 | 11/2020 | Gauss |

FOREIGN PATENT DOCUMENTS

CH 2007059883 5/2007

OTHER PUBLICATIONS

Nov. 6, 2020 REDCAMP Folding Outdoor Stove Windscreen, available on Amazon.com https://www.amazon.com/REDCAMP-Windscreen-Aluminum-Windshield-Lightweight/dp/B074556T6D/ref=sr_1_3?dchild=1&keywords=camp+grill+windscreen&qid=1604868497&sr=8-3.

*Primary Examiner* — Alfred Basichas

(57) ABSTRACT

A system and methods of preventing the rapid cooling of a fuel supply to a portable stove.

20 Claims, 12 Drawing Sheets

STOVE FUEL HEAT REFLECTOR

FIELD OF THE INVENTION

The present disclosure relates to a portable stove fuel source heating system, and more particularly, to a system and methods of preventing the rapid cooling of a fuel supply to a portable stove.

BACKGROUND OF THE DISCLOSURE

The physical state of a substance can change when the conditions experienced by the substance change. Among others, some conditions that can change the physical state of fuel sources are pressure and temperature. By changing the pressure or temperature of a fuel source, the physical state of the fuel source can change into a gas, a solid, a liquid, and even other states such as a supercritical fluid. This principle, changing gases into liquids through application of pressure or temperature, is a very common form of storage for combustible gases, such as propane, butane, methane, nitrogen, and various other gases and liquified petroleum gases used in a diverse array of applications. While stored as a liquid, when released from the container under standard temperature and pressure (STP), it becomes a gas upon reaching the intended point of combustion, allowing devices to burn the gaseous state of the substance as fuel despite using a container that contained a liquid form of the substance.

This thermodynamic principle is well measured and represented in phase change diagrams. The phase change diagrams below show how temperature (above-100 degrees Celsius and below 95 degrees Celsius, although shown in Kelvin) and pressure (from 0 bar to 16 bar) relate to determine the most probable physical state of a given substance. Here, the phase change diagrams have been given for Propane (C3H8) and Butane ($C4H_{10}$), two common forms of commercially available fuel. The curve itself is the vapor point, where it is equally probable that the substance is either a liquid or a gas. At all points above the curve, or vapor point, it is most likely that the substance is in a liquid state, and at all points below the curve, it is most likely that the substance is in a gaseous state.

In a contained system, pressure is a relation to temperature, whereby increasing or decreasing the temperature increases or decreases the pressure, respectively, in a ratio unique to each substance. Most importantly, decreasing the pressure decreases the temperature proportionately. Decreasing the pressure inside a container can be done in many ways, such as decreasing the temperature, expanding the volume of a container, and reducing the amount of gas in the container. Reducing the amount of gas in a container always occurs when the container of a finite amount of fuel is supplying gas as a fuel source, and as the pressure decreases so will the temperature decrease. This is called evaporative cooling. Therefore, the sole act of using fuel sources can itself cool the fuel source. As the phase change diagrams show, depending on the initial temperature and pressure conditions, a decrease in temperature, even if accompanied by a change in pressure, may result in a change of state.

Due to the thermodynamic principles, densities, and accompanying chemical properties of various states of matter many devices designed to use the gaseous state of these substances are not well suited to handle the liquid state of these gases and vice-versa. As the phase diagrams show, certain substances can exhibit phase changes at temperatures experienced by natural weather patterns, and when coupled with evaporative cooling effects, a broader range of temperatures can create problems for devices that require a fuel source to produce one state or another of a substance.

Butane, propane, and all other forms of combustible gases require a certain mixture of air (referring to the vaporous and gaseous composition of Earth's atmosphere) and gas to combust. An under- or over-presence of a given gas in the local atmosphere of the point of heat production will result in an inability to create combustion. As an example, for butane, there must be at least 1.8% of butane and 98.2% air in order to produce combustion, and at most 8.4% butane and 91.6% air. This minimum value, 1.8%, is called the lower flammability limit of butane, and this maximum value, 8.4%, is called the upper flammability limit. As a further example, the lower and upper flammability limits of propane are approximately 2.1% and 9.6%. Being that liquid is denser than gas, or even a higher-pressure physical state is denser than that same physical state at a lower pressure gas, in systems that supply a constant volume of fuel for combustion, the density of the fuel supplied affects the percentage of fuel in the fuel to air ratio, as a denser substance at the same volume of that same substance at a lesser density results in more of the substance being supplied.

During combustion of these gases or combination of gases, the mixture of oxygen is crucial to the safety of their use. The acquisition of oxygen ($O_2$) during combustion is ideally obtained naturally from the environment the combustion occurs in, though can be supplied in the system. Combustion of propane with a correct supply of air will produce only $CO_2$ and $H_2O$, otherwise called the resultants of their combustion. However, an improper air/gas mixture will produce Carbon Monoxide (CO) as its resultant, a harmful substance to humans. With cook top ranges, as one example, an over-presence of propane and an under-presence of oxygen presents a serious risk of harmful Carbon Monoxide ingestion.

Thus, in cold climates some fuel supplies undergo a thermodynamic change of physical state. When using stoves, especially camping stoves, it is advantageous to prevent a fuel supply from taking a different physical state, such as a liquid, than the stove is designed to use, such as a gas. By stabilizing the physical state of the fuel supply at the intended state, the stove can produce heat safely and efficiently.

SUMMARY OF THE DISCLOSURE

In one embodiment, a portable fuel source heating system includes a fuel supply thermal system, a portable stove with a portable stove lid, and a fuel supply being used to supply a point of heat production to create an infrared heat. Fuel supply thermal system promotes the elimination of external atmospheric forces, including without limitation, wind, thermal cooling from fuel supply pressure changes, or cold temperatures that disturb the creation of infrared heat at the point of heat production. Fuel supply thermal system may be, but not necessarily must be, retrofitted onto portable stoves. Portable stove includes the point of heat production and the fuel supply to create infrared heat. Fuel supply can use combustible gases, such as propane, butane, methane, nitrogen, and various other gases and liquified petroleum gases to create infrared heat. Fuel supply thermal system includes a reflective structure which may have at least one layer of reflective material disposed or affixed onto it. The reflective structure or the at least one layer of reflective material may form at least one concavity positioned to at least partially surround the fuel supply. The at least one concavity can be formed by either a single reflective structure, a plurality of reflective structures, the at least one layer of reflective material forming a concavity, or multiple local concavities on the reflective structure or the at least one layer of reflective material.

In a further embodiment, fuel supply thermal system is made of a continuous panel forming a reflective structure which may have at least one layer of reflective material. The concavity ensures that infrared heat is coupled in infrared communication with the fuel supply. Concavity is formed by at least partially surrounding the fuel supply with the reflective structure to promote more reliable combustion or heat production.

In a further embodiment, an alternative portable stove positions the point of heat production directly above the fuel supply. The fuel supply thermal system is constructed, and operates, in substantially the same way as in relation to any portable stove. The reflective structure partially surrounds fuel supply and, as a result of the placement of the point of heat production of portable stove, simultaneously surrounds the point of heat production.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings.

The present application discloses a portable fuel source heating system 2 which uses an infrared light given off by a point of heat production 6 to communicate infrared light from the point of heat production 6 to a fuel supply 4 to warm the fuel supply 4. Warming fuel supply 4 maintains its desired state and ensures an uninterrupted delivery of fuel to the heat source of a portable camping stove.

Figure 1:
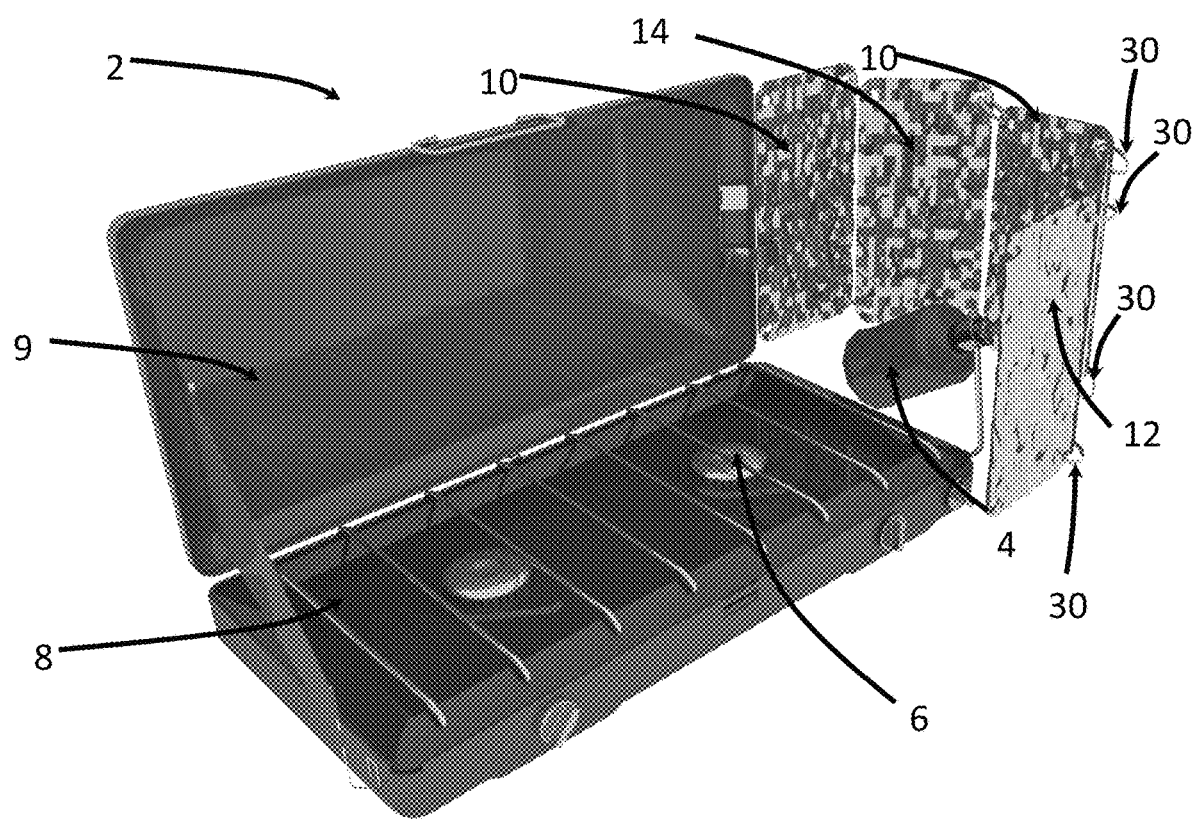
FIG. 1 is a perspective view of a portable fuel source heating system having a fuel supply thermal system coupled to a portable stove, having a fuel supply thermal system being made of a reflective structure with at least one concavity.

FIG. 1 illustrates a portable fuel source heating system 2 including a portable stove 8 with a portable stove lid 9, and the fuel supply 4 used to supply fuel to the point of heat production 6, which then creates infrared heat. Thus, portable stove 8 can use fuel supply 4 to create infrared heat. The portable fuel source heating system 2 promotes the elimination of external atmospheric forces from acting on the fuel supply 4, including without limitation, wind, snow, or cold temperature that disturbs the creation of infrared heat from the point of heat production 6. Portable fuel source heating system 2 may be, but not necessarily must be, retrofitted onto or positioned independently next to portable stove 8. Fuel supply 4 can be combustible gases, such as propane, butane, methane, nitrogen, and various other gases, including all physical states, and preferably liquified petroleum gases to create infrared heat. Portable fuel source heating system 2 includes a reflective structure 12 which may have at least one layer of reflective material 10 layered, disposed, or affixed onto it. Portable fuel source heating system 2 at least partially surrounds the fuel supply 4, preferably forming at least one concavity 14 described herein.

In order to effectively utilize the infrared light that is produced from the point of heat production 6, it is advantageous to redirect the infrared light towards a focal point, thereby increasing the amount of infrared light 18 received by the object of focus. In the present invention, the fuel supply 4 is the intended object of focus, although it need not be. An object surrounding or extending from the fuel supply 4, such as a container or mounting apparatus for the fuel supply 4, or the means that communicates fuel from the fuel supply 4 to the point of heat production 6 may also be an appropriate point of focus, given the nature of the specific fuel based system of heat production. In order to effectively focus incident light, such as infrared light, on an object, a concavity 14 is especially beneficial. The concavity 14 allows an object to redirect light, such as infrared light, from a large area of space to a concentrated point of focus, such as the fuel supply 4, by intersecting the path of infrared light produced by the point of heat production 6. Infrared light need not be redirected to the fuel supply 4 by concavity 14.

Figure 6:
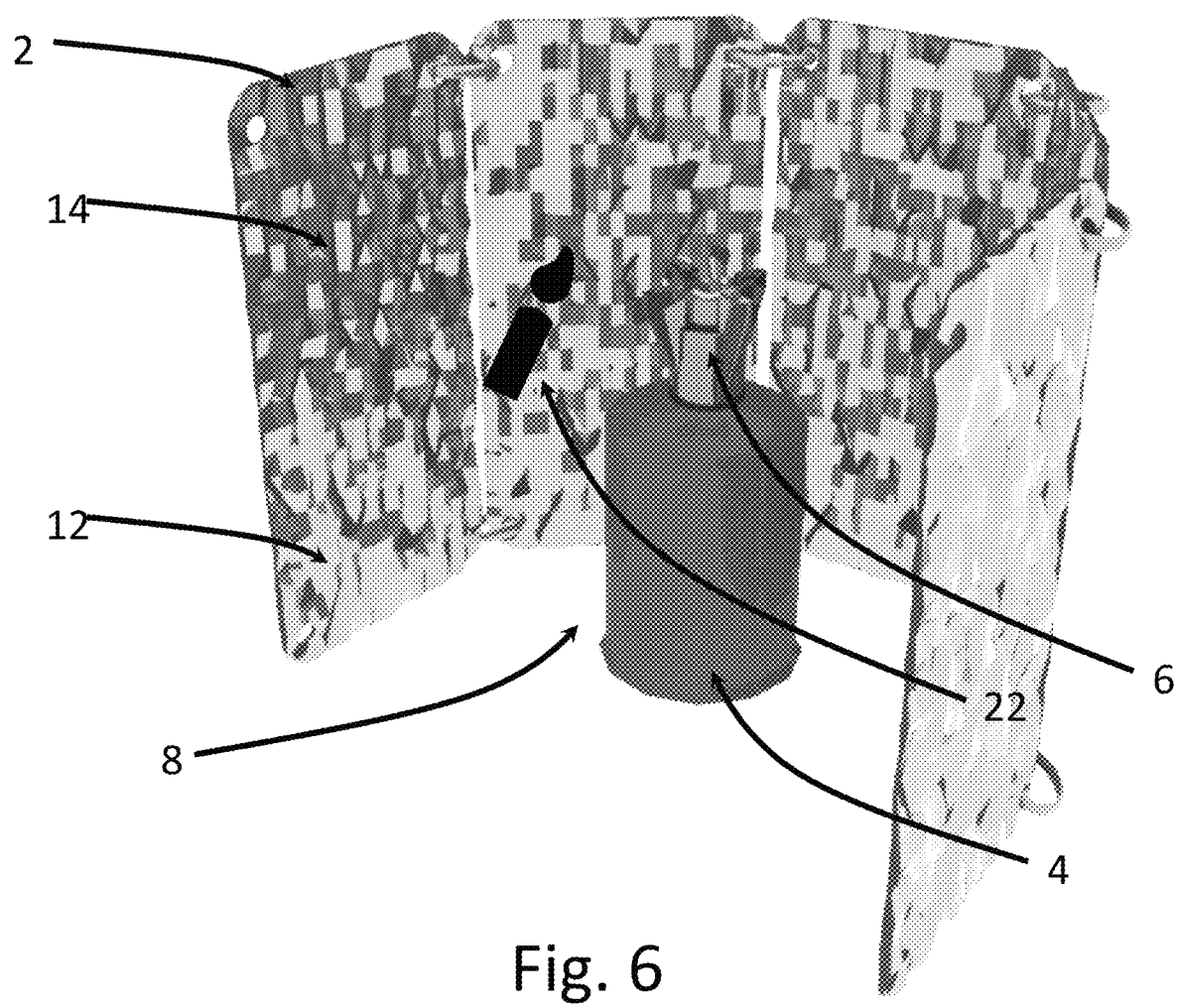
FIG. 6 is a perspective view of an alternate stove fuel source heating system having a point of heat production positioned above a fuel supply, having a fuel supply thermal system coupled to a portable stove and being made of individual panels with a layer of reflective material.
Figure 9:
FIG. 9 is a cut perspective view of a fuel supply thermal system coupled to a portable stove, having the fuel supply thermal system being made of reflective structures possessing at least one local concavity.
Figure 10:
FIG. 10 is a perspective view of a fuel supply thermal system lying in a separate horizontal plane from the point of heat production.

The present invention contemplates the use of a reflective structure 12 in isolation, disposed singly upright, flat, or even with convex material able to redirect infrared light 18 towards the fuel supply 4, as shown in FIGS. 6, 9, and 10. Under most circumstances, however, it is preferable to incorporate concavity 14 into the portable fuel source heating system 2. Concavity 14 can be entirely located upon one of the reflective structure 12 as a result of an arch or angle placed in the structural shape of reflective structure 12, the texture or surfacing of reflective structure 12, or formed by the disposition of the portable fuel source heating system 2 in relation to the point of focus, such as the fuel supply 4. The portable fuel source heating system 2, being a composition of at least one reflective structure 12, may utilize a combination of any or all of the above forms of concavity 14, as shown in FIG. 7.

Figure 3:
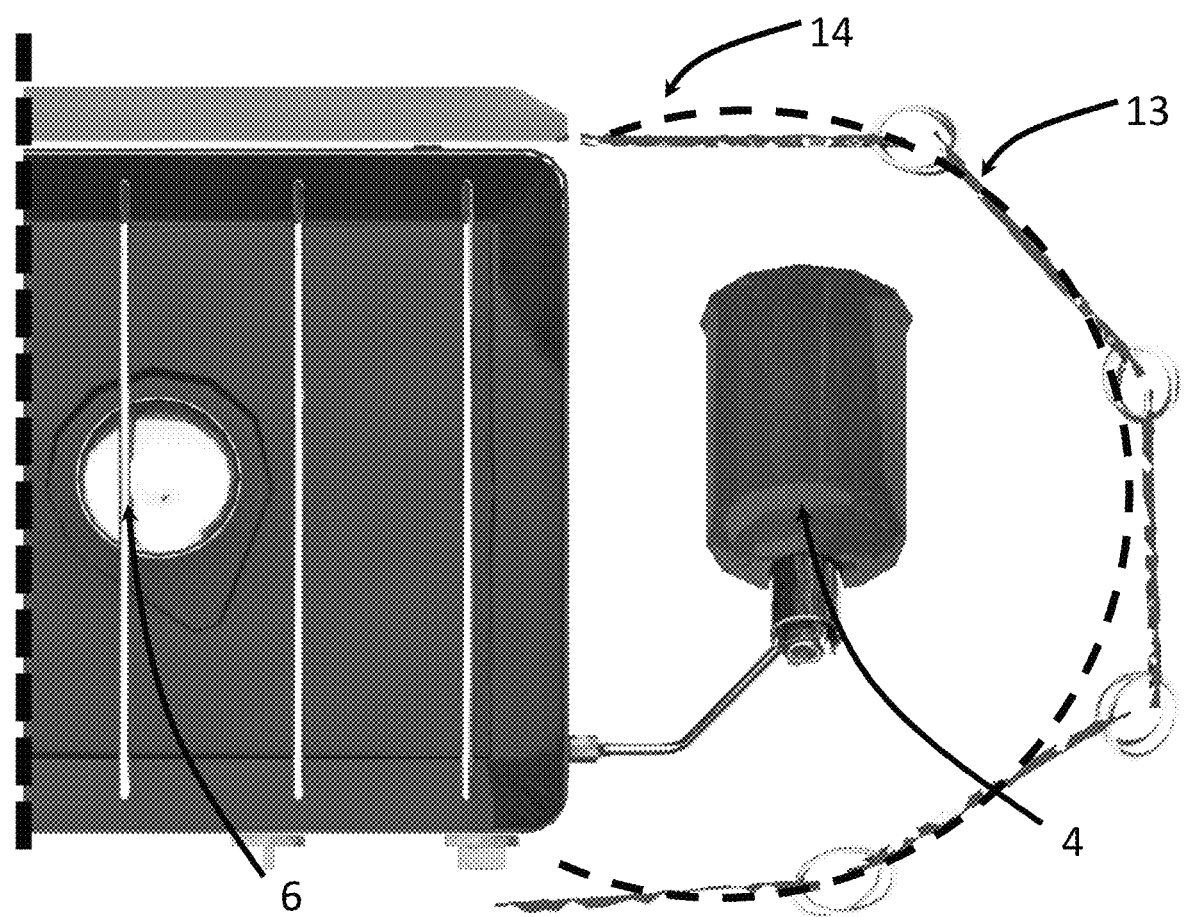
FIG. 3 is a top perspective view of a portable fuel source heating system having a fuel supply thermal system made of individual panels with a layer of reflective material positioned at least to form a concavity relative to the fuel supply.
Figure 5:
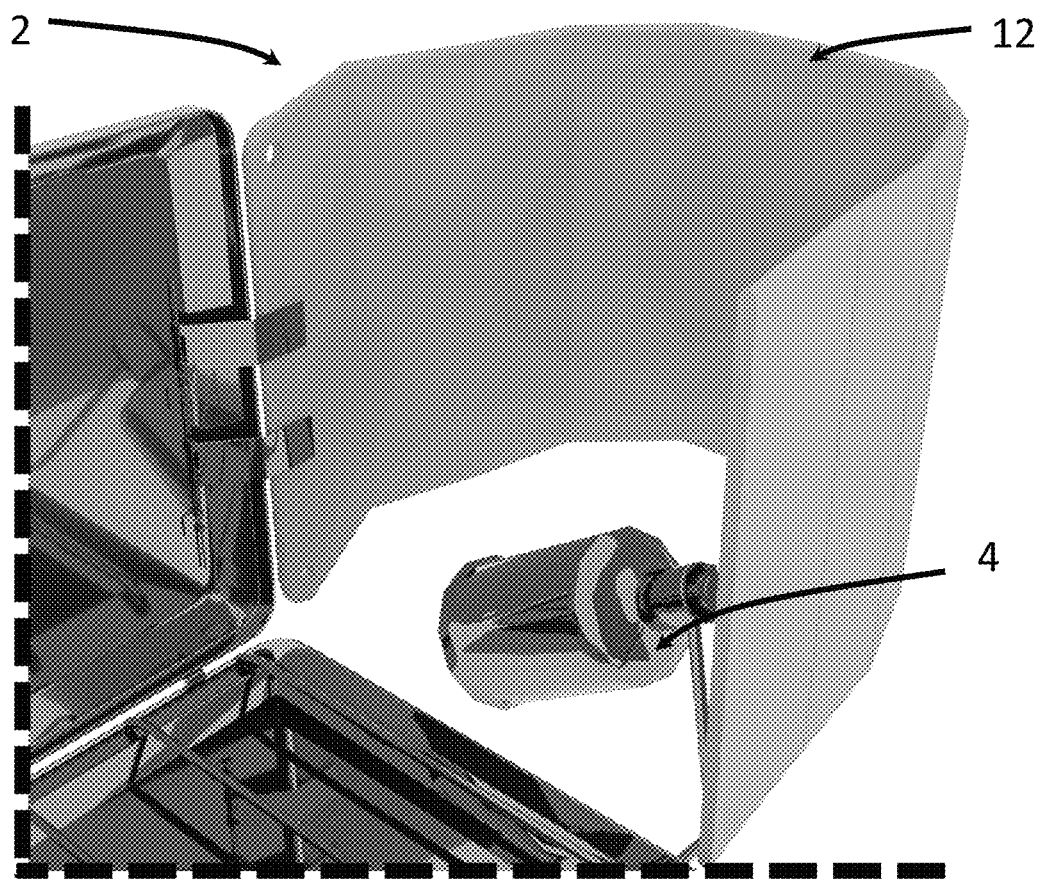
FIG. 5 is a perspective view of a portable fuel source heating system having a fuel supply thermal system coupled to a portable stove, having a fuel supply thermal system being made of a continuous panel with a layer of reflective material.
Figure 8:
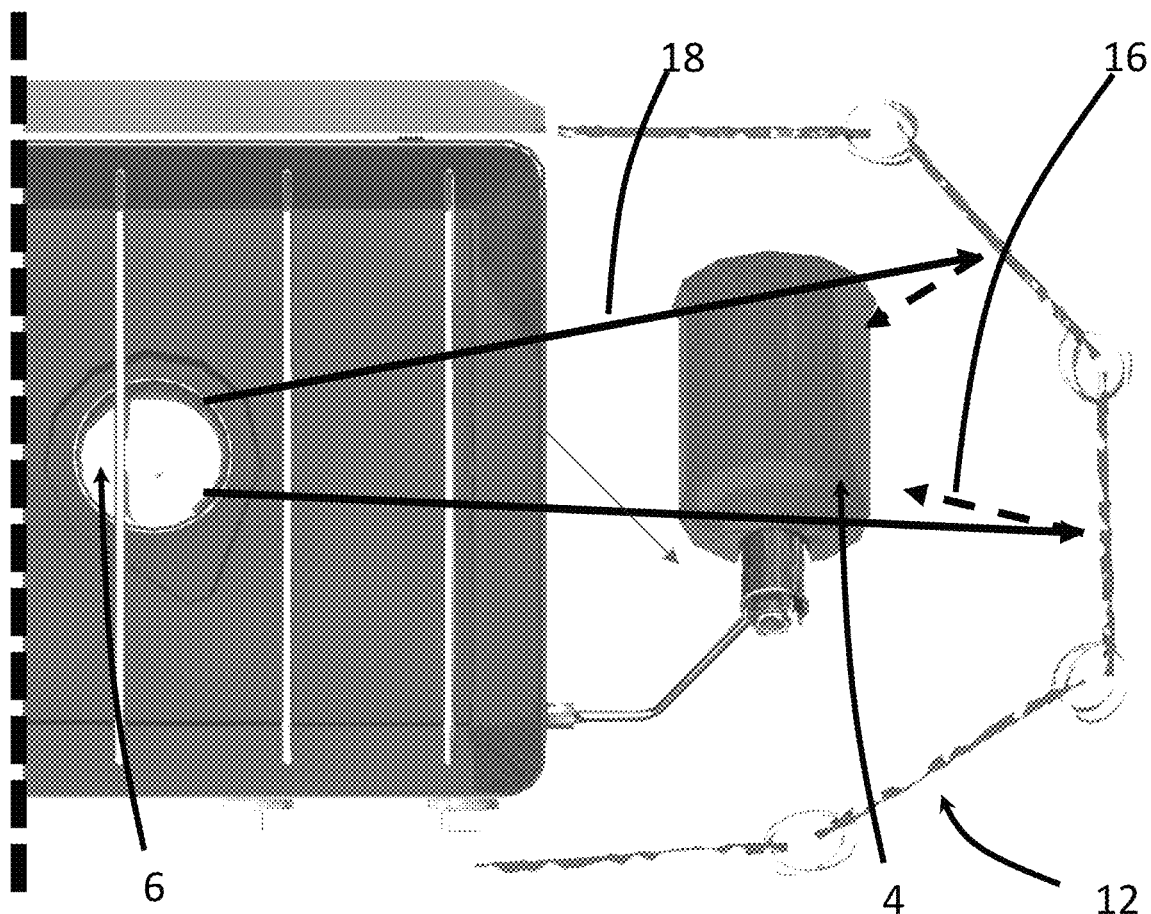
FIG. 8 is a depiction of the process by which infrared light is reflected from the point of heat production.

FIGS. 3, 5, and 8 depict how concavity 14 is formed by the disposition of the portable fuel source heating system 2 in relation to the point of focus, such as fuel supply 4. In FIG. 3, the dashed line depicts the arc of concavity 14 formed by the manner in which the portable fuel source heating system 2 disposes the plurality of reflective structures 12 relative to the fuel supply 4. Similarly, in FIG. 5, while the portable fuel source heating system 2 is composed of the continuous reflective structure 12 devoid of concavity 14 in its surface or structure, the portable fuel source heating system 2 still forms a concavity 14 by the manner in which the otherwise devoid reflective structure 12 is positioned relative to the fuel supply 4.

Figure 7:
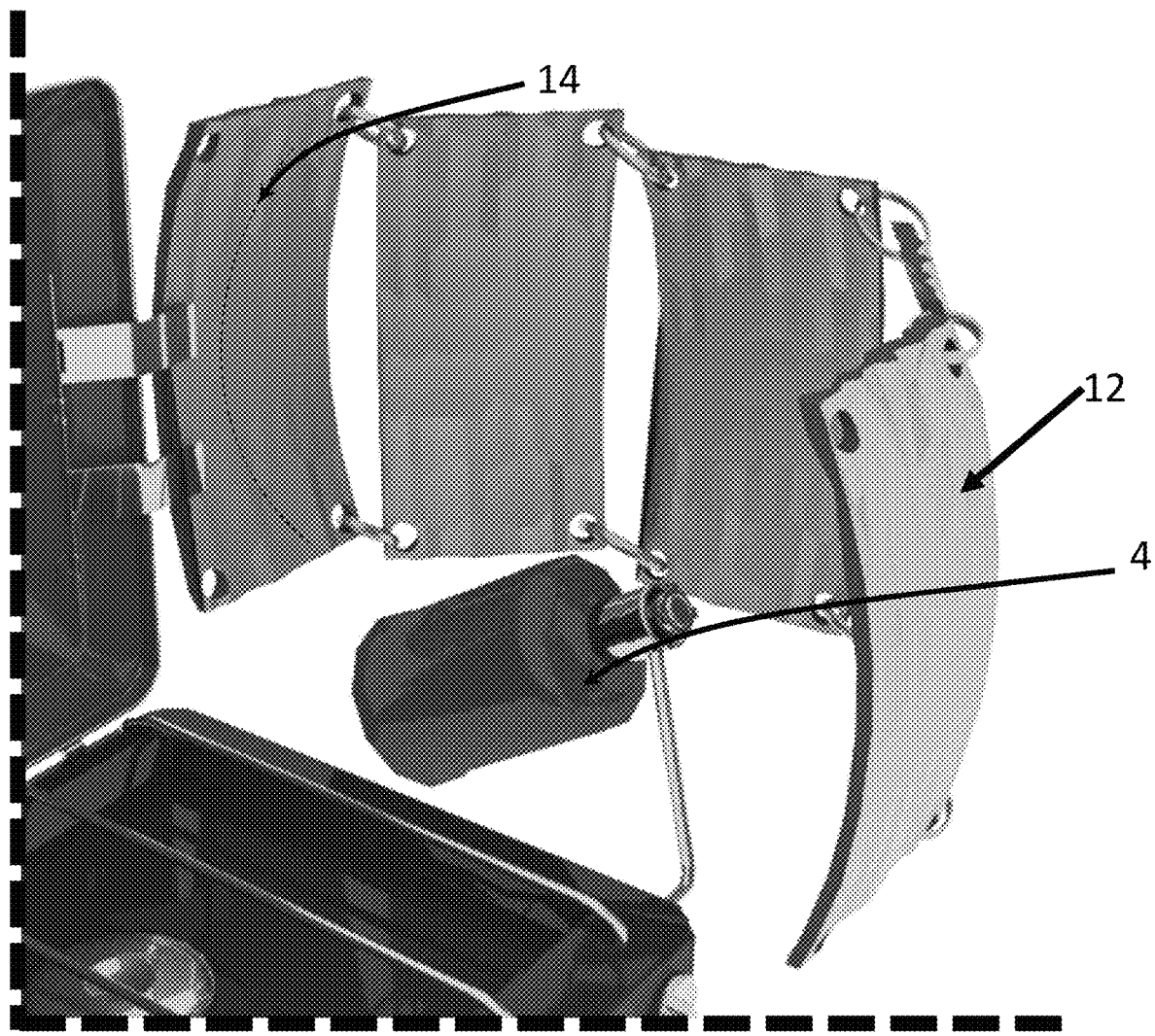
FIG. 7 is a cut perspective view of a fuel supply thermal system coupled to a portable stove, having the fuel supply thermal system being made of reflective structures possessing at least one structural concavity and at least one local concavity.

In FIG. 7, the dashed line depicts how concavity 14 is formed when located entirely upon one reflective structure 12 as a result of an arch or angle placed in the structural shape of reflective structure 12. As shown, reflective structure 12 possess the same contour in its frame as concavity 14 located upon it, and reflective layer 10 can possess the same concavity 14 as the reflective structure 12. A further manner in which to form the concavity 14 into the reflective structure 12 can be provided by having the reflective structure 12 be straight or entirely vertical up for some portion of the reflective structure 12, and then place an angle, arch, protrusion, and the like into or on the reflective structure 12 for another portion of the reflective structure 12, resulting in the reflective structure 12 bearing an pitch to direct incident infrared light as opposed to the standard, curved depiction of the concavity 14. FIG. 7 also depicts the portable fuel source heating system 2 forming the concavity 14 in relation to the fuel supply 4.

FIG. 1 depicts how concavity 14 is formed when located entirely upon one reflective structure 12 as a result of the texture or surfacing of reflective structure 12. In FIG. 1, due to the texture of the reflective layer 10 of reflective structure 12, a plurality of concavities 14 are present in reflective structure 12. FIG. 1 also depicts the portable fuel source heating system 2 forming the concavity 14 in relation to the fuel supply 4. It will be understood by those having skill in the art that the portable fuel source heating system 2 may employ any combination of the various forms of concavities 14, even alongside portions that are not concave as described herein. FIG. 10 depicts an embodiment that, while shown having local concavities 14, does not require the concavity 14 to operate. In this embodiment, the flat panel of the reflective structure 12 simply reflects infrared light without being dependent upon concavity 14. The reflective structure 12 in such an embodiment may be positioned above, beside, or below the point of heat production 4 such that the infrared light incident upon it is directed into the general area of any object suitable for warming.

Further, when heat is produced, common forms of heat transmission are radiation and convection. This causes the air and material around the heat production, even if not in direct contact, to be heated, resulting in a warmed gas. Gases, when heated, move quickly and rise relative to colder air. Gases do not move in only direction, but instead move randomly in three dimensions with an overall course in one direction or another. When heated, the overall course of a gas is upward yet the gas still maintains semi-random movement in all three directions. Certain embodiments of the present invention, which will be discussed below, create a screen-like structure. A portable fuel source heating system 2 can act to temporarily inhibit, but not prohibit, the escape of the warmed gas away from the point of heat production. By doing so, the portable fuel source heating system 2 allows heat to be transmitted to the fuel supply 4 from the warmed gases via radiation and convection.

One facet of the present invention is the ability to stabilize the fuel to air ratio in the local atmosphere of the point of heat production 6, resulting in a more reliable source of combustion. By ensuring that the fuel supply 4 receives heat from the point of heat production 6, either solely through infrared light 18, by transmission of heat through warmed gas, or some combination thereof, the pressure of the fuel supply 4 will not decrease as quickly as it would without the heat it receives, if at all. One exemplary setting in which the present invention aids reliable combustion, is by preventing the fuel supply 4, such as propane, from cooling into a liquid, either through evaporative cooling effects or through losing heat to a cold atmosphere (such as by reaching thermodynamic equilibrium), despite a corresponding pressure decrease, and providing liquid propane to the point of heat production 6, here a point of combustion, resulting in the local atmosphere of the point of heat production 6 being composed of over 9.6% propane, which as explained above, prohibits combustion. For many devices, such as camping stoves, grills, or various burners, an inability to produce combustion is equivalent to an inability to produce heat. For preferred operation, the point of heat production uses a fuel to air ratio between 1-99 and 10-90 to produce combustion. This means for every 1 part fuel, by weight, the point of heat production utilizes at least 99 parts air. In certain embodiments, the present disclosure is designed to keep the fuel supply above temperatures such as 230K in order to facilitate achieving a stable fuel to air ratio.

Figure 11:
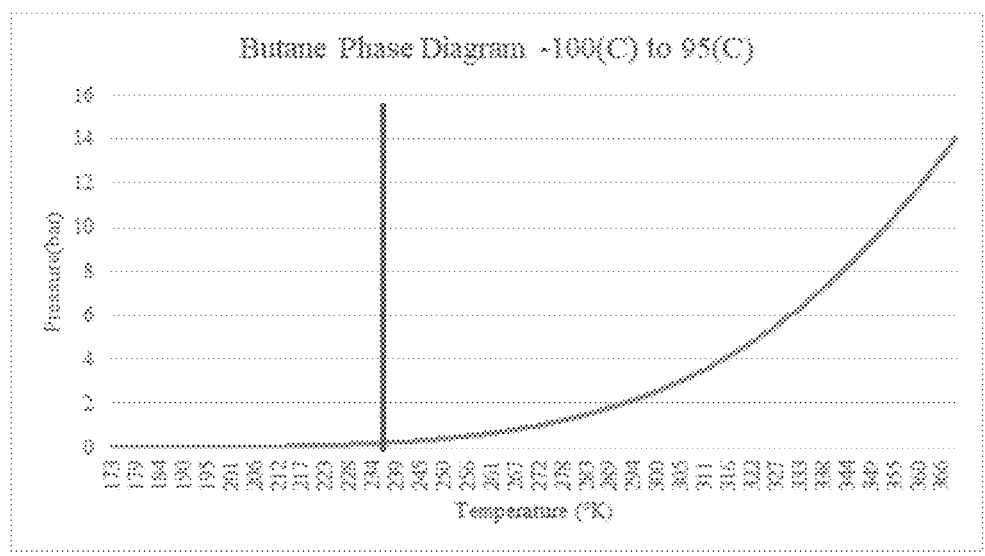
FIG. 11 is a phase diagram of Butane depicting most probable phase states of butane at each temperature and pressure including one of the present inventions intended temperature minimum.
Figure 12:
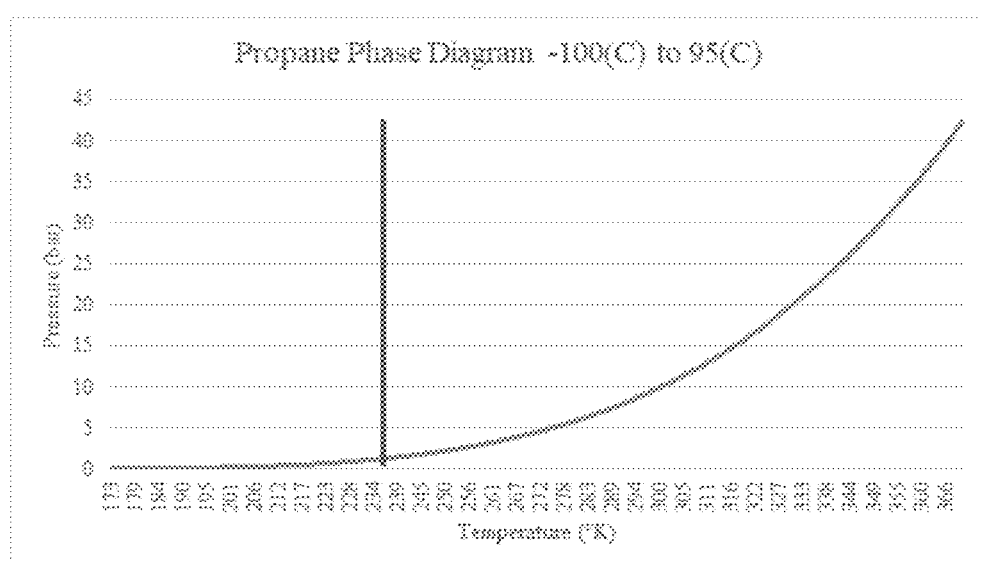
FIG. 12 is a phase diagram of Propane depicting most probable phase states of Propane at each temperature and pressure including one of the present inventions intended temperature minimum.

In a contained system, pressure is a relation to temperature. Increasing or decreasing the temperature increases or decreases the pressure, and decreasing the pressure decreases the temperature proportionately, as shown in FIGS. 11 and 12. Decreasing the pressure inside a container can be done by decreasing the temperature, expanding the volume of a container, and reducing the amount of gas in the container. Reducing the amount of gas in a container always occurs when the container of a finite amount of fuel is supplying gas as a fuel source, and since the pressure decreases so will the temperature decrease. This is called evaporative cooling. Decreasing the temperature inside of a fuel supply can also be done by using the fuel supply in cold local atmospheres. Therefore, the sole act of using fuel sources can itself cool the fuel source. Due to these reasons, certain embodiments of the present disclosure are designed to keep the fuel supply above 230K, as shown in FIGS. 11 and 12.

Another facet of the present invention is the ability to perform its heat communication functions without substantially obstructing the escape of the resultants from combustion or heat production. If $CO_2$ and $H_2O$, resultants from the combustion of most gases contemplated as fuel sources for fuel supply 4, do not escape from the local atmosphere of the point of heat production 6, the $CO_2$ and $H_2O$ will accumulate and replace the $O_2$ which would otherwise fill the space now occupied by the $CO_2$ and $H_2O$. The present invention makes it very difficult for $CO_2$ and $H_2O$ to remain and build up in the local atmosphere of the point of combustion or heat production, thereby ensuring the $CO_2$ and $H_2O$ do not accumulate and create an under-presence of $O_2$, which would result in harmful CO production.

FIG. 8 is a depiction of the process by which the fuel supply thermal system communicates heat from the point of heat production 6 to the fuel supply 4. In the depiction of FIG. 8, the point of heat production 6 is a point of combustion and is fueled by the fuel supply 4. The fuel supply 4 supplies fuel to the point of heat production 6 producing combustion, resulting in, among other things not shown, infrared light 18 and warmed gas, containing resultants of combustion along with the normal gaseous composition of the Earth's atmosphere. The portable fuel source heating system 2, being coupled in infrared communication 16, reflects the infrared light 18 produced by the point of heat production 6, toward the fuel supply 4, thereby achieving one form of communication of heat from the point of heat production 6 to the fuel supply 4.

Importantly, there need not be combustion, such as a flame, for the invention to transmit infrared light to the fuel supply. A common example known in the art is similar to a common toaster, whereby electric current is ran through a nichrome wire, causing the wire to produce heat and infrared light. The present invention is capable of using non-combustion sources of heat, such as electrified nichrome wire, to reflect infrared light to the fuel supply 4. Further, the source of infrared light 18 need not be from the point of heat production 6 that uses the fuel provided by the fuel supply 4. As shown in FIG. 6, an external point of heat production 22 may be introduced and produce the infrared light 18 needed to warm the fuel supply. Such an introduction of the external point of heat production 22 could be useful when the fuel supply 4 needs to be warmed before the point of heat production 6 of the portable stove 8 can begin to produce heat. While the present invention contemplates and includes the use of the external point of heat production 22, separate from the point of heat production 6 that uses the fuel supply 4, introduced into the system to warm the fuel supply 4, the present invention attains its fullest benefit by using the point of heat production 6 to warm the fuel supply 4 with the infrared light 18 already being produced by the fuel supply 4, thereby requiring no more energy than is already present in the initial system of the portable fuel source heating system 2.

Figure 2:
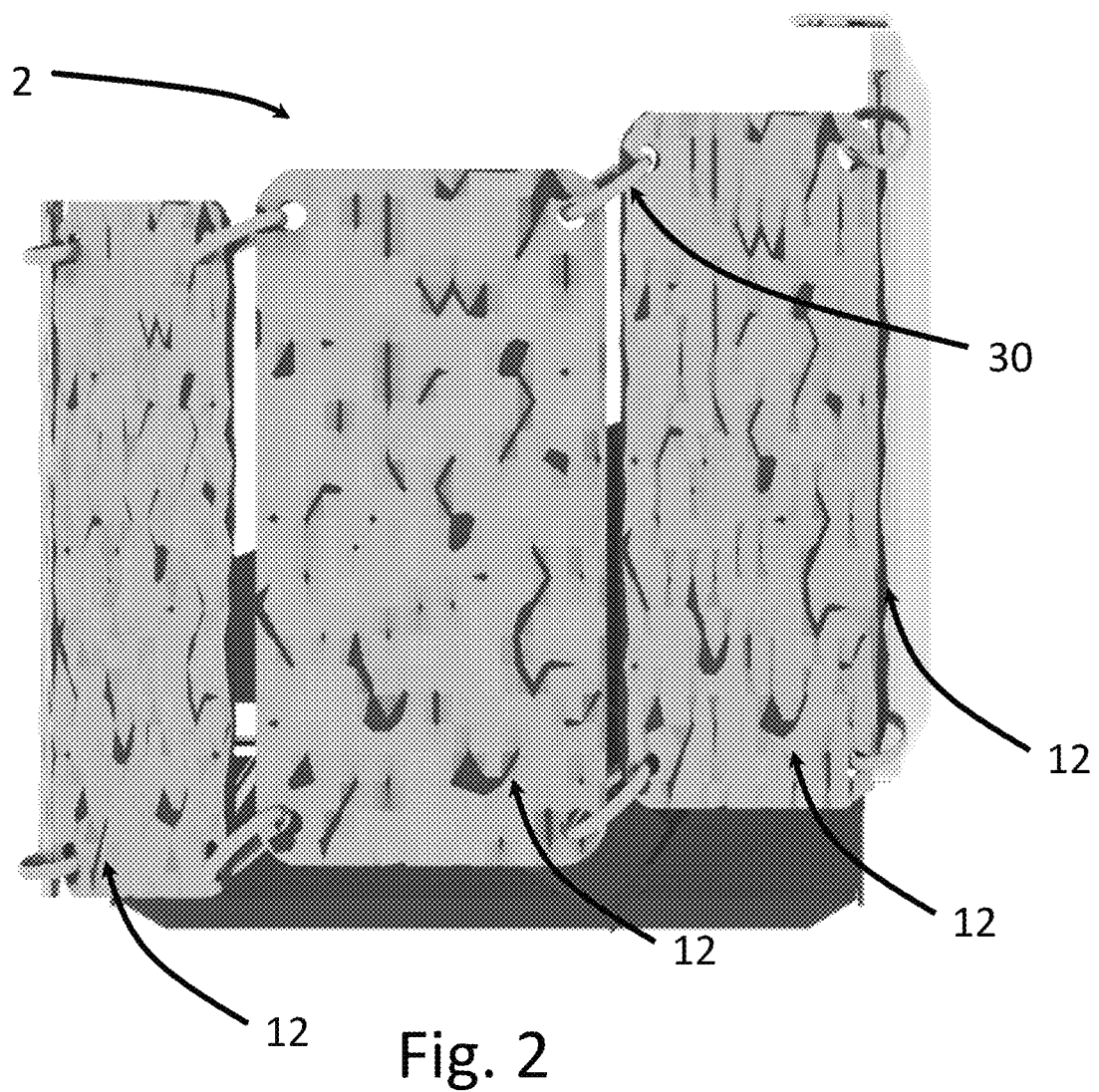
FIG. 2 is a side perspective view of a portable fuel source heating system having a fuel supply thermal system made of individual panels with a layer of reflective material.

When portable fuel source heating system 2 is attached to portable stove 8, portable fuel source heating system 2 may independently support itself as well as the portable stove lid 9, as shown in FIG. 2. Portable fuel source heating system 2 may be foldably collapsible into the portable stove 8. When portable fuel source heating system 2 is configured to be foldably collapsible, the entire structure of portable fuel source heating system 2 may fit within the portable stove 8 when portable stove lid 9 is closed.

The reflective structure 12 is the individual structure including or supporting the layer of reflective material 10. While the reflective structure 12 often possesses the same contours and form as the layer of reflective material 10, it need not possess the same contours. The embodiment of FIG. 1 depicts the reflective structure 12 having a dimpled layer of reflective material 10. In the embodiment of FIG. 1, the reflective structure 12 may also be dimpled, or may be perfectly flat and have the dimpled layer of reflective material 10 affixed to it. The reflective structure 12 may exist in various shapes and geometric orientations and may be positioned at any point coupled in infrared communication 16 to the point of heat production 6 or some other source of infrared light 18. As shown in FIG. 8, reflective structure 12 is coupled in infrared communication 16 to the source of infrared light 18 so long as the source of infrared light 18, such as the point of heat production 6, is able to communicate some portion of the infrared light 18 it produces to the reflective structure 12, either directly or by means of reflection, such as from another reflective structure 12. In some embodiments, reflective structure 12 may contain the same reflective capabilities as the layer of reflective material 10. In yet a further embodiment, reflective structure 12 can compose at least a partial reflective hose or tube that reflects infrared light 18 or directs warmed gas from the source of heat production 6 to a point that correlates to the region that hose terminates, operating similarly to a fiber-optic cable.

For example, not every square inch of the reflective structure 12 needs to receive and reflect infrared light 18 from the point of heat production 6. Some portion, or perhaps all of one individual reflective structure 12 if the portable fuel source heating system 2 is composed of at least two reflective structures 12, may be obstructed by an object that absorbs all infrared light 18 incident upon it, while other portions of the reflective structure 12 may still receive and reflect infrared light 18. While the reflective structures 12 of the portable fuel source heating system 2 partially surround the point of heat production 6 and sit both below and above the point of heat production 6, reflective structure 12 may exist entirely above or entirely below the point of heat production 6, as shown in FIG. 10. There reflective structures 12 can be placed anywhere, so long as they remain coupled in infrared communication 16 to some source of infrared light 18, such as the point of heat production 6 or an external source of heat production.

Figure 4:
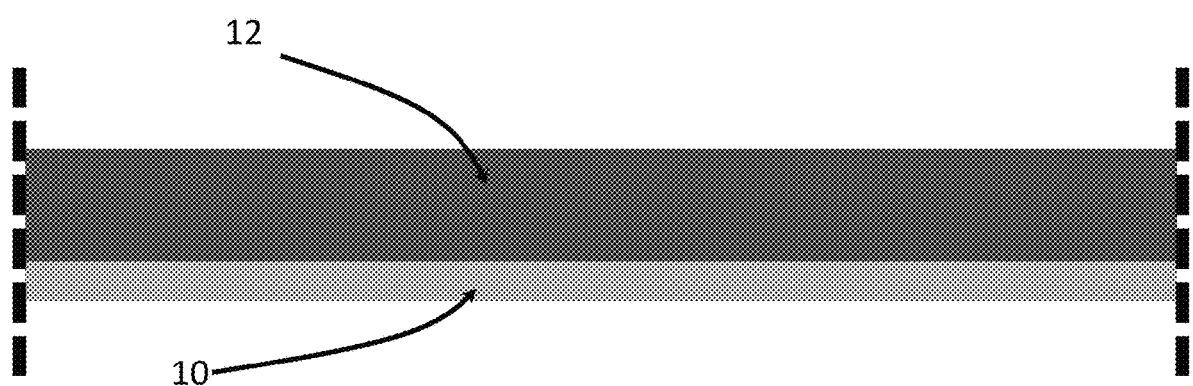
FIG. 4 is a cut perspective of a reflective structure.

FIG. 4 is a top down view of a horizontal cross section of reflective structure 12 displaying the at least one layer of reflective material 10 on the reflective structure 12. In this embodiment, the at least one layer of reflective material 10 is affixed to the reflective structure 12, wherein reflective structure 12 can provide structure to hold the at least one layer of reflective material 10. The reflective structure 12 need not be, though may be, made of material that reflects infrared light 18. When the reflective structure 12 is not made of the same material as the at least one layer of reflective material 10 the reflective structure 12 is a support structures used to support the layer of reflective material 10. Therefore, reflective structure 12 may be solid, hollow, or no more than a frame that defines the edges of the reflective structure 12. While in this embodiment, reflective structure 12 provides the form for the layer of reflective material 10, a frame for the reflective structure 12 need not be present, and in other embodiments a single layer of reflective material 10 alone may form the reflective structure 12. The at least one layer of reflective material 10 need not be disposed continuously or contiguously. A series of strips of reflective material may be disposed over reflective structure 12 rather than one contiguous layer of reflective material 10. In order to reduce the cost of production and portability, lightweight and cheap material such as plastics may be used. Any material may be used that can support the chosen at least one layer of reflective material 10, though non-flammable materials are preferred as well as materials that do not lose their integrity quickly under heat.

A further option for the material of reflective structure 12 is insulative material, to further aid the containment and transmission of heat to the fuel supply. Materials well suited for this would have a k-value below 2, such as most woods, cork, cotton, fiberglass, glass, and most earthen soil. Depending on the environment the portable fuel source heating system 2 is used, however, reflective structure 12 may be made of materials that encourage the release of non-infrared light-based heat, such as warmed gas, to prevent over-heating the fuel source. Materials well suited for this would have a k-value above 2, such as aluminum, iron, copper, and even manganese. Reflective structure 12 may also be used to block gusts of wind from interfering with the local atmosphere of the point of heat production 6. The amount of air allowed to pass through the portable fuel source heating system 2 varies based on the way the reflective structure 12 or the plurality of reflective structures 12 surround the point of heat production 6. Reflective structure 12 of the portable fuel source heating system 2 may be designed to allow in enough air from wind gusts to continue to provide for the local atmosphere around the point of heat production 6, or they may be designed to forbid any wind from providing air to the local atmosphere around the point of heat production 6. The wind transmission rate of the panels, defined by the percentage of the portion of the surface area of reflective structure 12 that can transmit wind through the reflective structure 12 divided by the entire surface area of reflective structure 12 incident to wind, may be as low as 0 to completely prohibit each reflective structure 12 from allowing wind to pass through it, or at its upper limit approach 95 if the reflective structure 12 is composed of a reflective mesh material.

Conversely, it may be advantageous to expose the local atmosphere of the point of heat production 6 to wind and various other conditions, or to completely surround the point of heat production 6 while still allowing the resultants of combustion to exchange with the air outside of the local atmosphere of the point of heat production 6. In such circumstances, the reflective structure 12 may be composed of a reflective mesh that may be substituted as the layer of reflective material 10 and reflective structure 12, wherein the reflective mesh can be positioned to surround the point of heat production 6 in whatever capacity necessary. In such embodiment, the reflective mesh composing the reflective structure 12 can be positioned to reflect infrared light 18 back towards the fuel supply 4 or to some other reflective structure 12 that would then reflect infrared light 18 to fuel supply 4. By using a reflective mesh for the reflective structure 12, and depending on the angle upon which wind is incident upon the reflective mesh of reflective structure 12, the wind transmission rate of the panels may be higher than the construction of reflective structure 12 shown in FIG. 1.

FIG. 2 is a side perspective view of the portable fuel source heating system 2 of FIG. 1. In the embodiment of FIG. 1, the portable fuel source heating system 2 is composed of the plurality of reflective structures 12 coupled to each other by a plurality of foldable connectors 30 and forming the concavity 14, not shown, as a result of their positioning. In the embodiment of FIG. 2, the first reflective structure 12 of the portable fuel source heating system 2 is coupled to the portable stove lid 9 with each successive reflective structure 12 descending from its previous reflective structure 12 by an amount determined by its foldable connectors 30, in this embodiment descending by an amount proportional to the inner diameter of the foldable connectors 30. In this embodiment, at least one of the reflective structures 12 may rest on the ground thereby supporting a portion of the weight of the portable fuel source heating system 2. In other embodiments, the plurality of reflective structures 12 need not be coupled by foldable connectors 30, and may be rigidly coupled, or be a system of reflective structures 12 that have no direct physical contact with each other.

FIG. 3 displays the portable fuel source heating system 2 of the embodiment of FIG. 1 from the top looking down. In this embodiment, portable fuel source heating system 2 is designed to laterally surround the fuel supply 4 while terminating after slightly overlapping with portable stove 8. By laterally surrounding fuel supply 4, portable fuel source heating system 2 forms the concavity 14 relative to fuel supply 4. In other embodiments, portable fuel source heating system 2 need not laterally surround the fuel supply 4. It may vertically, spherically, partially, radially, or laterally surround the fuel supply 4, or any combination of means of surrounding the fuel supply 4.

FIG. 6 is a perspective view of an alternative portable stove 8. Portable stove 8 positions the point of heat production 6 directly above the fuel supply 4. The portable fuel source heating system 2 is constructed, and operates, in substantially the same way as in relation to portable stove 8. Portable fuel source heating system 2 partially surrounds fuel supply 4 and, as a result of the placement of the point of heat production 6 of portable stove 8, simultaneously surrounds the point of heat production 6. In the embodiment shown portable fuel source heating system 2 is a freestanding structure unaffixed to the portable stove 8, laterally and partially vertically surrounding fuel supply 4. Portable fuel source heating system 2 may also be affixed to portable stove 8, and surround fuel supply 4 by any means possible just as in the embodiment of FIG. 1. Further, portable fuel source heating system 2 may also be disposed entirely above or entirely below the point of heat production 6, so long as the layer of reflective material 10 of the portable fuel source heating system 2 is still coupled in infrared communication 16 to the fuel supply 4.

The invention claimed is:

1. A camp stove assembly for a fuel supply, a burner configured to provide a point of heat production at a first location, wherein the point of heat production is fluidly connectable to the fuel supply at a separate second location, the camp stove assembly comprising:
a reflective structure comprising at least one panel, each at least one panel comprising a reflective material and a concavity located entirely on the reflective material of the at least one panel, wherein the concavity is positionable to reflect heat or infrared light from the point of heat production at the first location to the fuel supply at the second location.

2. The camp stove assembly of claim 1, wherein the concavity is defined by the entirety of a single panel of the at least one panel of the reflective structure, forming a single panel concavity, wherein the single panel concavity has a first end and a second end, the first and second ends lie on a first vertical plane and the single panel concavity is concave relative to the first vertical plane.

3. The camp stove assembly of claim 1, wherein the reflective structure further comprises a second concavity defined by a plurality of the at least one panels.

4. The camp stove assembly of claim 1, wherein the concavity is defined by at least one dimple in the reflective layer, and wherein the concave portion of the at least one dimple is positionable to reflect heat or infrared light from the point of heat production to the fuel supply.

5. The camp stove assembly of claim 1, wherein the concavity is defined by an angle in the reflective structure.

6. The camp stove assembly of claim 1, wherein the reflective structure is at least partially circumscribes the point of heat production.

7. The camp stove assembly of claim 1, wherein the point of heat production receives fuel from a fluid of the fuel supply.

8. The camp stove assembly of claim 1, wherein the reflective structure includes at least a first panel and a second panel, the first panel coupled in infrared communication to at least the second panel, the point of heat production, and the fuel supply.

9. The camp stove assembly of claim 1, wherein the reflective structure comprises a reflective mesh.

10. The camp stove assembly of claim 1, wherein the point of heat production uses a fuel to air ratio between 1:99 and 10:90 to produce combustion.

11. The camp stove assembly of claim 1, wherein the reflective structure reflects heat to the fuel supply, such that the fuel supply is warmed to above a temperature of 230k.

12. The camp stove assembly of claim 1, wherein a bottom end of the at least one panel is farther away in a lateral direction from the point of heat production than a top end of the at least one panel.

13. The camp stove assembly of claim 1, wherein each panel further comprises a plurality of concavities, wherein the plurality of concavities are differently oriented, and wherein at least a first concavity and a second concavity of the plurality of concavities are not simultaneously positionable to reflect heat or infrared light from the point of heat production at the first location to the fuel supply at the second location.

14. A method for warming a fluid fuel supply of a camping stove, the method comprising:
   providing a reflective structure comprising at least one panel comprising a reflective material, the at least one panel defining a concavity located entirely on the reflective material of the at least one panel;
   fueling a source of infrared light with a fluid fuel supply;
   positioning the concavity of the at least one panel to direct infrared light from the source of infrared light at a first location towards a point of focus on the fuel supply at a separate second location; and
   heating the fluid fuel supply using the infrared light directed from the concavity.

15. The method of claim 14, wherein the point of focus is the fuel supply, and the fuel supply supplies fuel to the source of infrared light.

16. The method of claim 14, wherein the reflective structure includes at least two panels positioned to form a concavity relative to the point of focus.

17. A camp stove assembly for a fuel supply, the camp stove assembly comprising:
   a burner, the burner configured to provide a point of heat production at a first location, wherein the point of heat production is fluidly connectable to the fuel supply at a second location separate from the first location; and
   a reflective structure comprising at least one panel, each at least one panel comprising a reflective material and a concavity located entirely on the reflective material of the at least one panel, wherein the concavity is positionable to reflect heat or infrared light from the point of heat production at the first location to the fuel supply at the second location.

18. The camp stove assembly of claim 17, wherein the at least one panel is disposed exclusively below a horizontal plane of the point of heat production.

19. The camp stove assembly of claim 17, wherein the at least one panel is disposed exclusively above a horizontal plane of the point of heat production.

20. The camp stove assembly of claim 17, wherein the burner is comprised in a portable structure, and the reflective structure is attached to the portable structure.

* * * * *